United States Patent [19]

Arfsten et al.

[11] Patent Number: 4,849,252

[45] Date of Patent: Jul. 18, 1989

[54] DIPPING PROCESS FOR THE PRODUCTION OF TRANSPARENT, ELECTRICALLY CONDUCTIVE, AUGMENTED INDIUM OXIDE LAYERS

[75] Inventors: Nanning Arfsten, Bischofsheim; Reinhard Kaufmann, Mainz; Doris Schubert, Budenheim, all of Fed. Rep. of Germany

[73] Assignee: Schott-Glasswerke, Mainz, Fed. Rep. of Germany

[21] Appl. No.: 836,206

[22] Filed: Feb. 27, 1986

[30] Foreign Application Priority Data

Jul. 8, 1983 [DE] Fed. Rep. of Germany ....... 3324647

[51] Int. Cl.⁴ .............................................. B05D 5/12
[52] U.S. Cl. .................... 427/108; 427/160; 427/164; 427/169; 427/226; 427/229; 427/377; 427/379
[58] Field of Search ............... 427/108, 160, 226, 164, 427/169, 229, 377, 379; 428/432, 433, 434, 697

[56] References Cited

U.S. PATENT DOCUMENTS

| | | | |
|---|---|---|---|
| 2,617,741 | 11/1952 | Lytle | 427/108 |
| 2,617,742 | 11/1952 | Olson | 427/108 |
| 2,617,745 | 11/1952 | Raymond et al. | 427/108 |
| 2,762,725 | 9/1956 | Saunders | 427/108 |
| 3,850,665 | 11/1974 | Pluma et al. | 427/226 |
| 4,252,841 | 2/1981 | Kinugawa et al. | 427/108 |
| 4,268,539 | 5/1981 | Nakayama et al. | 427/108 |
| 4,289,829 | 9/1981 | Rosetti | 427/229 |
| 4,327,131 | 4/1982 | Branovich et al. | 427/229 |
| 4,485,094 | 11/1984 | Pebler | 427/226 |
| 4,492,721 | 1/1985 | Joosten et al. | 427/226 |

FOREIGN PATENT DOCUMENTS

1811158 6/1970 Fed. Rep. of Germany.
3147398 6/1983 Fed. Rep. of Germany.

*Primary Examiner*—Janice Bell
*Attorney, Agent, or Firm*—Wegner & Bretschneider

[57] ABSTRACT

In a process for producing transparent, electrically conductive, augmented layers of indium oxide by means of a dipping process, during which the substrate to be coated is dipped into a solution containing hydrolyzable compounds of indium, whereupon the substrate is withdrawn from the solution, is dried, and tempered at temperatures of up to 500° C., a dipping solution is used which, in addition to the indium compound, contains at least one additional hydrolyzable compound of an element in the 2nd, 4th or 5th main groups, in the 1st, 2nd, 4th, 5th or 8th subgroup of the periodic system of elements, or of the rare earths.

9 Claims, No Drawings

DIPPING PROCESS FOR THE PRODUCTION OF TRANSPARENT, ELECTRICALLY CONDUCTIVE, AUGMENTED INDIUM OXIDE LAYERS

DESCRIPTION OF THE INVENTION

1. Technical Field of the Invention

This invention relates to a dipping process for the production of transparent, electrically conductive, augmented indium oxide coatings.

2. Background Art

There is great interest in transparent, conductive oxide coatings for the purposes of heat reflection, for displays, heating (e.g., defogging), and much more. As compared to metallic layers, oxide layers are characterized by considerably greater chemical and mechanical stability and, therefore, their suitability for being employed on the exterior. Augmented indium oxide differs from the familiar oxide layers, such as fluoro-augmented tin oxide, antimony augmented tin oxide, and cadmium stannate, by very high conductivity at high transmission values. According to the current state-of-the-art, indium oxide is augmented with tin oxide. Other augmenting agents have also become known for $In_2O_3$-layers manufactured in a vacuum and spray process, such as $In_2O_3$ charged with Cd, Sb, Ti, Zr, and fluoride; see R. Groth, Phys. Stat. Sol 14: 69 (1966), but they have not found any practical application.

Quality and economic feasibility of augmented indium oxide coatings are decisively influenced by the process used for application. Known are the vacuum processes, which generally require high investments. Also familiar are spray and CVD-processes, which however use much material that is not transformed into the coating and has to be reprocessed in an expensive process, particularly in the case of the expensive indium. For cadmium, the toxicity problem is considerable. The dipping process does not have these disadvantages and is therefore preferable. In the case of tin-augmented indium oxide, however, it has the same disadvantage as the other processes in that it requires a special, reducing gas atmosphere at high temperatures during or after the application process in order to obtain optimum electrical and optical properties. This frequently leads to the need for non-catalytic wall materials in order to prevent proportional $H_2$-combustions from the reducing gas. Moreover, it is necessary to have gas-tight furnaces operating at high temperatures.

A further disadvantage of the process according to the state-of-the-art is that the augmented indium oxide layers cannot be applied directly to a desirable substrate, in particular not to the most interesting substrate, namely float glass containing alkali, since according to the state-of-the-art the $Na^+$ ions which diffuse into the indium oxide coating reduce the conductivity of indium oxide coatings to an unacceptable degree.

The object of the present invention is therefore a process which does not have the disadvantages of the known processes. This objective is accomplished by the process described in the patent claims.

DISCLOSURE OF THE INVENTION

Accordingly, it is a general object of the present invention to provide an improved process for economically preparing transparent, electrically conductive indium oxide coatings having improved properties.

Another object of the present invention is to provide indium oxide coatings and articles of manufacture containing such coatings with augmented physical and electrical properties.

A further object of the present invention is to provide improved cermet coatings and compositions.

An additional object of the present invention is to provide improved gas sensors having essentially unchanged electrical properties over a varying response selectivity temperature range.

A more particular object of the present invention is to provide augmented indium oxide coatings which can be directly applied to alkali-containing substrates such as glass without the need for an alkali barrier layer between coating and substrate.

Upon study of the specification and appended claims, further objects, features and advantages of the present invention will become more fully apparent to those skilled in the art to which this invention pertains.

BEST MODE FOR CARRYING OUT THE INVENTION

Briefly, the above and other objects, features and advantages of the present invention are attained in one aspect thereof by providing a process for the production of transparent, electrically conductive indium oxide coatings by dipping a substrate capable of being coated with indium oxide into a solution containing a hydrolyzable indium compound capable of forming said coating, removing excess solution from the coated substrate, then drying and tempering the resultant substrate, wherein the dipping solution additionally contains an effective amount of at least one hydrolyzable compound which is capable of augmenting the electrical properties of the resultant coating in comparison with indium oxide alone and which contains an element in the 2nd, 4th or 5th main group, or in the 1st, 2nd, 4th, 5th or 8th subgroup of the Deming Periodic System of elements, or of the rare earth metals.

Use is made of hydrolyzable compounds of indium combined with hydrolyzable compounds of the 2nd, 4th or 5th main group and the 1st, 2nd, 4th, 5th or 8th subgroup or the rare earth elements, e.g., Ag, Au, Cu, Ca, Mg, La, Nb, Rh, Os, Ir, Ta, Pt, Hf, Hg, As, Bi, Sb, Zn, Cd, Y, Si, Ti, Zr, Pb, Ge, Co, Pd, Ce, Nd, Ni, Ru, V, Fe, in alcoholic solutions, and, if necessary, with the additions of chelate-forming agents, such as acetylacetone, acetoacetic acid ethyl ester, monocarboxylic acids, polycarboxylic acids, polyalcohols, such as glycol and glycerin, hydroxyketones, ketones, aldehydes, aliphatic and aromatic hydrocarbons, aliphatic and aromatic amines such as pyridine, alpha-picoline, triethylamine, ethanol amine, urea and urotropine.

The hydrolyzable compounds are, e.g., alkoxides, nitrates, salts of organic acids, such as acetates, chelates, e.g., acetylacetonates, etc.

The production of such solutions is simple and considerably less expensive than producing two- or several-component targets for a sputter process. Maintaining a desired composition or stoichiometry of the layer—again in contrast to the vacuum process—is simple and reliable even for systems with two and several components, probably because the reactive components already react while in solution or, at the latest, during formation of the coating.

The substrate, e.g., a glass plate, is dipped in the familiar manner into such a solution, is withdrawn from it at a steady rate into an atmosphere of conditioned temperature and humidity, and finally is heated to 400°–500° C. in the presence of air. Suitable substrates are all glasses, including particularly the alkali-containing float glasses, silica glasses, glass ceramics, mica, as well as metals, such as copper, iron, and others.

The solutions employed according to the present invention have the advantage of providing excellent wetting of the substrates, which is even better than that of many of the familiar dipping solutions for coating glass.

In the present invention cadmium-containing indium solutions have proved to be particularly advantageous, while simultaneosly allowing the CdO augmentation of $In_2O_3$-coatings to be varied by up to four orders of magnitude.

When the additions are >1 mol % of CdO relative to $In_2O_3$, the coatings, even on alkali-containing float glass, achieve their full conductivity of <500 Ohms/-square when heated to 500° C. in the presence of air. This is a surprising finding for dipped coatings because alkalies diffuse well at 500° C.

At low CdO-contents and with coatings produced at temperatures of below 500° C., conductivity can be further improved by a very simple reforming process. It is very simple and economical because it can be carried out in a forming gas atmosphere, which does not need to be set rigidly and does not need to be maintained at a constant value, and because it can be carried out at 200°–350° C. in simple furnaces, which need not be airtight. Compared to state-of-the-art techniques, gas-tight furnaces, as well as the transportation system in them and the special, non-catalytic wall materials, are eliminated. The reforming is particularly advantageous for thin glasses, e.g., of 0.5 mm, because they cannot readily be heated to 500° C. without deformation. This type of glasses is used for displays, with the desired surface resistivities specifically lying in the area of 200–500 Ohms/square as provided by the process of the invention. The layers produced in this manner can be etched with diluted hydrochloric acid, a requirement placed on display layers.

In the past, $In_2O_3$-coatings augmented wtih CdO have been applied in a spraying process on hot glass plates; see R. Groth, Phys. Stat. Sol 14: 69 (1966). Such an $In_2O_3$-coating containing 1.5% of CdO has an electron concentration of $3\times10^{19} cm^{-3}$ and a mobility of 6 $cm^2V^{-1}s^{-1}$ and therefore is far inferior to the coatings of the invention, having values of $3.3\times10^{20} cm^{-3}$ and 16 $cm^2V^{-1}s^{-1}$. Additionally, coatings produced in a spraying process do not have the required homogeneity; the loss of spraying material, which cannot be transformed into the coating, is uneconomical. For spraying processes the problems resulting from toxic Cd-compounds are considerable, but there are no problems with the dipping processes, since the solution does not dissipate into the air but only remains on the substrate. Vapour pressures are low for the Cd-compounds used; MAK-values (maximum working environment concentration) are maintained.

In the sputter process of R. Groth, Phys. Stat. Sol 14: 69 (1966) coatings of CdO, having been augmented with 5 percent per atom of indium, were produced having a coating thickness of 281 nm, which have a mobility of 2.3 $cm^2V^{-1}s^{-1}$ and a specific electrical conductivity of 189 $Ohms^{-1}cm^{-1}$. This corresponds to a surface resistivity of 188 Ohms/square, which by comparison is again inferior to the coatings of the present invention.

The most recent citation in the literature, G. Haake, SPIE Vol. 324 Optical Coatings for Energy Efficiency and Solar Applications (1982, reports about $CdIn_2O_4$-coatings (RF Sputter Process) having a electrical conductivity of 3,000–4,000 $Ohms^{-1}cm^{-1}$, which would be excellent values. The absence of additional data, such as charge carrier concentration, mobility, and coating thickness, prevents a more detailed comparison with the coatings of the present invention. Moreover, these $CdIn_2O_3$- coatings are described only for silica glass.

In the process according to the present invention it is, among other things, surprising to find that coatings of good electrical conductivity form directly on glass containing alkali. This seems to be an as yet unexplainable characteristic of the coating composition of this invention, and can be observed especially for coatings of $In_2O_3$ containing Cd. This represents a remarkable technological advance since until now alkali-containing glass, which has been used most frequently as a substrate, has always required that an alkali barrier layer, e.g., of $SiO_2$, be applied first, due to alkali diffusion in the state-of-the-art processes. Elimination of the barrier layer represents a considerable economic advantage.

The other augmentation substances also exhibit heretofore unobserved, specific properties. For example, indium oxide coatings which have been augmented with silver, gold, copper, palladium, ruthenium, rhodium and platinum, can be called cermet coatings.

In this connection, a palladium-augmented indium oxide coating, if suitably installed, can be used as gas sensor, particularly for hydrogen, oxygen, nitrogen, alcohol, and water. The response selectivity of the coating depends on the temperature; e.g., the temperature of the layer should be 120°–150° C. for oxygen measurements, whereas a temperature of 25°–50° C. is sufficient to measure ethanol concentrations in the atmosphere. A special advantage results from the fact that both sides are inevitably coated when coating by means of a dipping process. The top side, on which the contacts are located, functions proportionally better as a sensor, whereas the underside can serve to heat the substrate due to its suitable resistivity. When an 80 V voltage is applied, the current which flows is usually about 200–500 milliampere, depending on the surface resistivity of the coating. It is sufficient to achieve a substrate temperature of 50°–250° C. In this temperature range the coating does not, for all practical purposes, change its properties, e.g., its surface resistivity. Among others, $In_2O_3$-coatings, which have been augmented with Cd, Pt, Rh, Ru, Zn and Ag, exhibit excellent sensor properties with the most varied gasses, such as saturated and unsaturated hydrocarbons, nitrogen oxides, sulfur dioxide, carbon monoxide, alcohols, hydrogen, and others.

Indium oxide coatings augmented with titanium dioxide have a remarkable stability against concentrated acids. It is known that indium oxide and/or tin-augmented indium oxide coatings are relatively reasily soluble in acids. Indium oxide coatings augmented with titanium dioxide, however, do not dissolve, even after being exposed to diluted or concentrated acids, such as hydrochloric acid, nitric acid, and sulfuric acid, for hours. This type of coating represents ideal, transparent, electrically conductive electrodes for applications in chemically aggressive media.

Layers which have been augmented with calcium are characterized by special hardness.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

COMPARATIVE EXAMPLE

Indium Oxide Dipping Solution and Coating 26.5 g Indium-III-nitrate are dissolved in a mixture of 16 ml water and 14 ml acetic acid and are diluted with 200 ml of ethanol.

A borosilicate glass plate (Tempax TM) is dipped into the indium oxide dipping solution and is then withdrawn from the solution at a constant speed (of 0.6 cm per second). The plate is briefly pre-dried at 250° C., is then heated to 400° C. in an nitrogen/hydrogen atmosphere, and then suddenly cooled again.

In the following Examples, the indium oxide component of the dipping solution is an aqueous acidic solution of an inorganic indium salt diluted with an excess of alcohol.

A layer produced in this manner has the following properties:
  Layer thickness: 61 nm
  Surface resistivity: 432 Ohms/square
  Electrical conductivity: 379 cm$^{-1}$
  Charge carrier concentration: $7.5 \times 10^{19}$ cm$^{-3}$
  Mobility: 31 cm$^2$V$^{-1}$s$^{-1}$.

EXAMPLE 1

Indium Oxide Coating Augmented With Cadmium Oxide

An indium oxide dipping solution produced as described in the comparative example is supplemented with 5 g cadmium acetate (Cd(OOCCH$_3$)$_2 \times$ 2 H$_2$O), while stirring, and is diluted further with 40 ml of ethanol.

A 2 mm thick float glass plate is dipped into the dipping solution and is withdrawn at a constant speed. After drying for 2 minutes at 250° C. the coated plate is heated to 500° C. in the presence of air, and is maintained at this temperature for 5 minutes. After cooling, the coating has the following properties:
  Coating thickness: 60 nm
  Surface resistivity: 194 Ohms/square
  Electrical conductivity: 830 Ohms$^{-1}$cm$^{-1}$
  Mobility: 16 cm$^2$V$^{-1}$s$^{-1}$
  Charge carrier concentration: $3.3 \times 10^{20}$ cm$^{-3}$
  Transmission (550 nm): ca. 80%
  Reflection (550 nm): ca. 17%

EXAMPLE 2

Indium Oxide Coating Augmented With Cadmium Oxide With Subsequent Reforming

A thin glass plate of 0.7 mm thickness is dipped into a dipping solution produced as described in Example 1, and is withdrawn at a constant speed. After pre-drying for 2 minutes at 250° C., the coated plate is heated to 430° C. in the presence of air and is then cooled to room temperature. Subsequently, the coated glass plate is reheated at 250° C. for 5 to 10 minutes in a forming gas atmosphere comprising essentially about 10 Vol. % hydrogen, about 90 Vol. % nitrogen, <1% oxygen and <0.1% water. Surface resistivity is about 800–1,200 Ohms/square prior to forming; afterward, the coat has a surface resistivity of 200–300 Ohms/square.

EXAMPLE 3

Indium Oxide Coating Augmented With A Small Amount Of Cadmium Oxide

An indium oxide dipping solution produced as described in the comparative example is supplemented with 1.5 g cadmium acetate (Cd(OOCCH$_3$)$_2 \times$ 2H$_2$O) while the solution is being stirred.

The coating is produced as described under Example 1. The surface resistivity of such a coating is >500 KOhms. If such a coating is heated to 400° C. in a forming gas atmosphere, and is then suddenly cooled, it will have a surface resistivity of 450 Ohms/square.

EXAMPLE 4

Indium Oxide Coating Augmented With Zinc Oxide 5.7 g zinc nitrate (Zn(NO$_3$)$_2 \times$ 4H$_2$O) are dissolved by stirring into an indium oxide dipping solution produced as described in the comparative example, whereupon the solution is diluted with 250 ml of ethanol.

A borosilicate glass plate is dipped into the dipping solution produced and is withdrawn at a constant speed. After drying at 250° C. for 5 minutes, the coated plate is heated to 450° C. in the presence of air and is cooled at once. The sample is then tempered in a forming gas atmosphere at 350° C. for 10 minutes. A coating produced in this manner has the following properties:
  Layer thickness: 90 nm
  Surface resistivity: 343 Ohms/square
  Charge carrier concentration: $1.6 \times 10^{20}$ cm$^{-3}$
  Mobility: 13 cm$^2$V$^{-1}$s$^{-1}$
  Electrical conductivity: 330 Ohms$^{-1}$cm$^{-1}$.

EXAMPLE 5

Indium Oxide Coating Augmented With Palladium 1 g of palladium(II)-acetylacetonate is dissolved, while stirring, into an indium oxide dipping solution produced as described in the comparative example.

A borosilicate glass plate is dipped into the dipping solution and is withdrawn at a constant speed. The sample is heated to 500° C. in the presence of air and is suddenly cooled. The coating has a surface resistivity of 1.6 KOhms. After forming at 400° C. for 5 minutes, the layer has a surface resistivity of 300 Ohms/square.

EXAMPLE 6

Indium Oxide Coating Augmented With Titanium Dioxide

An indium oxide dipping solution produced as described in the comparative example is supplemented with 9 g of titanium tetraethylate dissolved in 30 ml of ethanol and 20 ml of acetic acid.

A borosilicate glass plate is slowly dipped into the dipping solution and is withdrawn at a constant speed. The coating is dried for 10 minutes at 250° C. and is tempered for 10 minutes at 500° C. in the presence of air. This type of layer has a surface resistivity of about 2 MOhms/ square. After tempering in a forming gas atmosphere for 15 minutes at 450° C., the layer has a surface resistivity of 630 Ohms/square. This layer has very good stability against concentrated acids and bases.

EXAMPLE 7

Indium Oxide Coating Augmented With Zirconium Dioxide

An indium oxide dipping solution produced as described in the comparative example is supplemented with 5 g zirconium tetrabutylate dissolved in 5ml of acetic acid and 20 ml of ethanol.

A borosilicate glass plate is slowly dipped into the dipping solution and is withdrawn at a constant speed. The coating is dried at 250° C. for 2 minutes, is heated to 500° C. and is suddenly cooled. This type of layer has a surface resistivity of >5 MOhms. After heating to 400° C. in a forming gas atmosphere and sudden cooling, this type of layer has a surface resistivity of 50 Ohms/square.

EXAMPLE 8

Indium Oxide Coating Solution Augmented With Magnesium Oxide

An indium oxide dipping solution produced as described in the comparative example is supplemented with 1.3 g magnesium nitrate ($Mg(No_3)_2 \times 2H_2O$) and is diluted with 50 ml ethanol.

A borosilicate glass plate is slowly dipped into the dipping solution and is withdrawn at a constant speed. The coating is dried at 250° C. for 5 minutes and is tempered in a forming gas atmosphere for 15 minutes at 500° C. A coating produced in this manner has a surface resistivity of 2.2 KOhms/square.

EXAMPLE 9

Indium Oxide Coating Augmented With Calcium Oxide

A dipping solution of indium oxide produced as described in the comparative example is supplemented with 1.4 g calcium nitrate ($Ca(NO_3)_2 \times 2H_2O$) and 100 ml ethanol.

A borosilicate glass plate is slowly dipped into the dipping solution and is withdrawn at a constant speed. The layer is dried at 250° C. for 5 minutes and is then tempered in a forming gas atmosphere at 500° C. for 45 minutes. A coating produced in this manner has a surface resistivity of 10-15 KOhms/square. The coatings of indium oxide augmented with calcium oxide are characterized by an exceptional coating hardness.

EXAMPLE 10

Indium Oxide Coating Augmented With Silver

A dipping solution produced as described in the comparative example is supplemented with 0.5 g silver nitrate.

A borosilicate glass plate is slowly dipped into the dipping solution and is withdrawn at a constant speed. The coating is dried for 5 minutes at 250° C. and is heated to 450° C. in the presence of air. After cooling, the coating is tempered in a forming gas atmosphere at 400° C. The coating has a surface resistivity of 3,000 Ohms/square.

EXAMPLE 11

Indium Oxide Coating Augmented With Neodymium Oxide

A dipping solution of indium oxide produced as described in the comparative example is supplemented with 3.9 g neodymium(III) acetylacetonate and diluted with 50 ml of ethanol.

A borosilicate glass plate is slowly dipped into the dipping solution and is withdrawn at a constant speed. The coating is dried at 250° C. for 5 minutes, and is then heated to 400° C. in a forming gas atmosphere. After cooling, this type of layer has a surface resistivity of 530 Ohms/square.

EXAMPLE 12

Indium Oxide Coating Augmented With Cadmium Oxide And Zinc Oxide

A dipping solution of indium oxide produced as described in the comparative example is supplemented with 19.5 g cadmium acetate ($Cd(OOCCH_3)_2 \times 2H_2O$) and 19.1 g zinc nitrate ($Zn(NO_3)_2 \times 4H_2O$) dissolved in 23 ml acetic acid and 22 ml water, and is then diluted with 150 ml of ethanol.

A borosilicate glass plate is slowly dipped into the dipping solution and is withdrawn at a constant speed. The coating is heated to 500° C. in the presence of air. A coating produced in this manner has a surface resistivity of 800 Ohms/square.

EXAMPLE 13

Indium Oxide Coating Augmented With Gold

A dipping solution of indium oxide produced as described in the comparative example is supplemented with 1.7 g of gold (III) chloride and 0.5 g of citric acid.

A borosilicate glass plate is slowly dipped into the dipping solution and is withdrawn at a constant speed. The coating is dried at 250° C. for 5 minutes and is tempered in a forming gas atmosphere at 450° C. for 10 minutes. This type of layer has a surface resistivity of 2,100 Ohms/square.

EXAMPLE 14

Indium Oxide Coating Augmented With Lead Oxide

A dipping solution of indium oxide produced as described in the comparative example is supplemented with 6 g of lead (II) acetate $Pb(COOCH_3)_2 \times 2H_2O$), dissolved in a 20 ml of glycol, and diluted with 150 ml of ethanol.

A borosilicate glass plate is slowly dipped into the dipping solution and is withdrawn at a constant speed. The coating is dried at 250° C. for 5 minutes and tempered in a forming gas atmosphere at 400° C. for 5 minutes. A coating produced in this manner has a surface resistivity of 1,800 Ohms/square.

EXAMPLE 15

Indium Oxide Coating Augmented With Cobalt Oxide

A dipping solution of indium oxide produced as described in the comparative example is supplemented with 1.1 g cobalt (II) nitrate ($Co(NO_3)_2 \times 4H_2O$).

A borosilicate glass plate is slowly dipped into the dipping solution and is withdrawn at a constant speed. The coating is died for 10 minutes at 250° C. and is tempered at 500° C. for 10 minutes in a forming gas atmosphere. A coating of this type has a surface resistivity of 300 KOhms/square.

EXAMPLE 16

Indium Oxide Coating Augmented With Vanadium Oxide

A dipping solution of indium oxide produced as described in the comparative example and is supplemented with 2.3 g of vanadium (IV) acetylacetonate and then with 0.5 ml of pyridine.

A borosilicate glass plate is slowly dipped into the dipping solution and is withdrawn at a constant speed. The coating is dried at 250° C. for 10 minutes and is then tempered at 500° C. for 10 minutes in a forming gas atmosphere. A coating of this type has a surface resistivity of 15 KOhms/square.

EXAMPLE 17

Indium Oxide Coating Augmented With Antimony Oxide

A dipping solution of indium oxide produced as described in the comparative example is supplemented with 2.4 g of antimony (III) chloride dissolved in 10 ml of acetoacetic acid ethylester.

A borosilicate glass plate is slowly dipped into the dipping solution and is withdrawn at a constant speed. The coating is dried at 250° C. for 10 minutes and is tempered at 500° C. for 10 minutes in a forming gas atmosphere. A layer of this type has a surface resistivity of 4.6 KOhms/square.

EXAMPLE 18

Indium Oxide Coating Augmented With Ruthenium

A dipping solution of indium oxide produced as described in the comparative example is supplemented with 1.0 g of ruthenium (III) chloride.

A borosilicate glass plate is slowly dipped into the dipping solution and is withdrawn at a constant speed. The coating is dried for 10 minutes at 250° C. and tempered in a forming gas atmosphere at 400° C. for 10 minutes. A coating produced in this manner has a surface resistivity of 420 Ohms/square.

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

Industrial Applicability

As can be seen from the present specification and examples, the present invention is industrially useful in providing an economical method for producing transparent, electrically conductive, augmented indium oxide coatings which are used in a wide variety of applications, e.g. heat reflection, optical displays, heating or sensor layers, etc.

What is claimed is:
1. A process for the production of a transparent, electrically conductive indium oxide coating, which comprises:
  (a) dipping an alkali-containing glass substrate into a dipping solution consisting essentially of,
    (i) an aqueous acidic solution of a hydrolyzed inorganic indium salt, and
    (ii) at, least one hydrolyzable augmentation compound dissolved therein in an amount effective to augment the electrical properties of the resultant coating in comparison with indium oxide alone and which contains an element from the group consisting of Mg, Ca, Y, La, Si, Ge, Pb, Sb, Bi, As, Cu, Ag, Au, Zn, Cd, Hg, Ti, Zr, Hf, V, Nb, Ta, Fe, Co, Ni, Ru, Rh, Pd, Os, Ir, Pt, Ce, and Nd;
  (b) removing excess dipping solution by withdrawing the coated substrate therefrom at a constant speed;
  (c) drying the resultant substrate;
  (d) tempering the coated substrate at 400°–500° C. in the presence of air; and
  (e) cooling the tempered substrate to room temperature to form a transparent single layer coating having said augmented electrical properties.

2. A process according to claim 1, wherein the tempered coating is refined by means of a reducing gas at a temperature of 200°–500° C.

3. A process according to claim 1 wherein the hydrolyzable augmentation compound is an alkoxide, nitrate, or chelate.

4. A process according to claim 3, wherein the augmentation compound is a chelate of acetylacetone or of an acetoacetic ester.

5. A process according to claim 1, wherein an effective amount of a chelate-forming augmentation compound is added to the dipping solution.

6. A process according to claim 5, wherein the chelate-forming augmentation compound is at least one member selected from the group consisting of acetylacetone, acetoacetic esters, mono-carboxylic acids, aldehydes, polyalcohol, polycarboxylic acids, ketones, hydroxyketones, aliphatic or aromatic hydrocarbons, and aliphatic or aromatic amines.

7. A process according to claim 6, wherein the chelate-forming augmentation compound is glycol or glycerine.

8. A process according to claim 6, wherein the chelate-forming augmentation compound is pyridine, alpha-picoline, triethylamine, ethanolamine, urea, or urotropine.

9. A process according to claim 1, wherein the dipping solution and glass substrate are at room temperature.

* * * * *